US012808762B2

(12) United States Patent
Haas et al.

(10) Patent No.: US 12,808,762 B2
(45) Date of Patent: Nov. 24, 2026

(54) METHOD AND MEASURING DEVICE FOR DETECTING MEASUREMENT SIGNALS

(71) Applicant: Helmut Fischer GmbH Institut fuer Elektronik und Messtechnik, Sindelfingen (DE)

(72) Inventors: Tanja Haas, Calw (DE); Henry Thiele, Doeffingen Grafenau (DE)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 336 days.

(21) Appl. No.: 18/580,841

(22) PCT Filed: Jul. 13, 2022

(86) PCT No.: PCT/EP2022/069661
§ 371 (c)(1),
(2) Date: Jan. 19, 2024

(87) PCT Pub. No.: WO2023/001672
PCT Pub. Date: Jan. 26, 2023

(65) Prior Publication Data
US 2024/0230490 A1 Jul. 11, 2024

(30) Foreign Application Priority Data
Jul. 19, 2021 (DE) ......................... 102021118556.4

(51) Int. Cl.
*G01N 3/06* (2006.01)
*G01N 3/46* (2006.01)
*G01N 3/56* (2006.01)

(52) U.S. Cl.
CPC ............... *G01N 3/068* (2013.01); *G01N 3/46* (2013.01); *G01N 3/56* (2013.01); *G01N 2203/0082* (2013.01)

(58) Field of Classification Search
CPC ............ G01N 3/068; G01N 3/40; G01N 3/42; G01N 3/46; G01N 3/56; G01N 19/00; G01N 2203/0082
See application file for complete search history.

(56) References Cited

U.S. PATENT DOCUMENTS

2022/0196529 A1 6/2022 Haas et al.

FOREIGN PATENT DOCUMENTS

| | | | |
|---|---|---|---|
| DE | 69917780 | T2 | 6/2005 |
| DE | 102006012374 | A1 | 9/2007 |
| DE | 102016123010 | A1 | 5/2018 |
| JP | 2004028949 | A1 | 1/2004 |
| WO | 2019149931 | A1 | 8/2019 |

*Primary Examiner* — Benjamin R Schmitt
(74) *Attorney, Agent, or Firm* — KRIEGSMAN & KRIEGSMAN

(57) ABSTRACT

Method and measuring device for detecting measurement signals during a penetrating movement of an indenter into a surface of a test specimen or a coating of a test specimen. The indenter is placed on a starting point of the test specimen by a control system of a measuring device. The indenter is subjected to a test force acting in a Z-direction up to an end point of the test section, and a superimposed displacement movement of a measuring table, receiving the specimen, in a X-direction and in a Y-direction is controlled. Measuring signals are detected by at least two measuring devices during the displacement movement of the indenter.

15 Claims, 3 Drawing Sheets

METHOD AND MEASURING DEVICE FOR DETECTING MEASUREMENT SIGNALS

Figure 1:
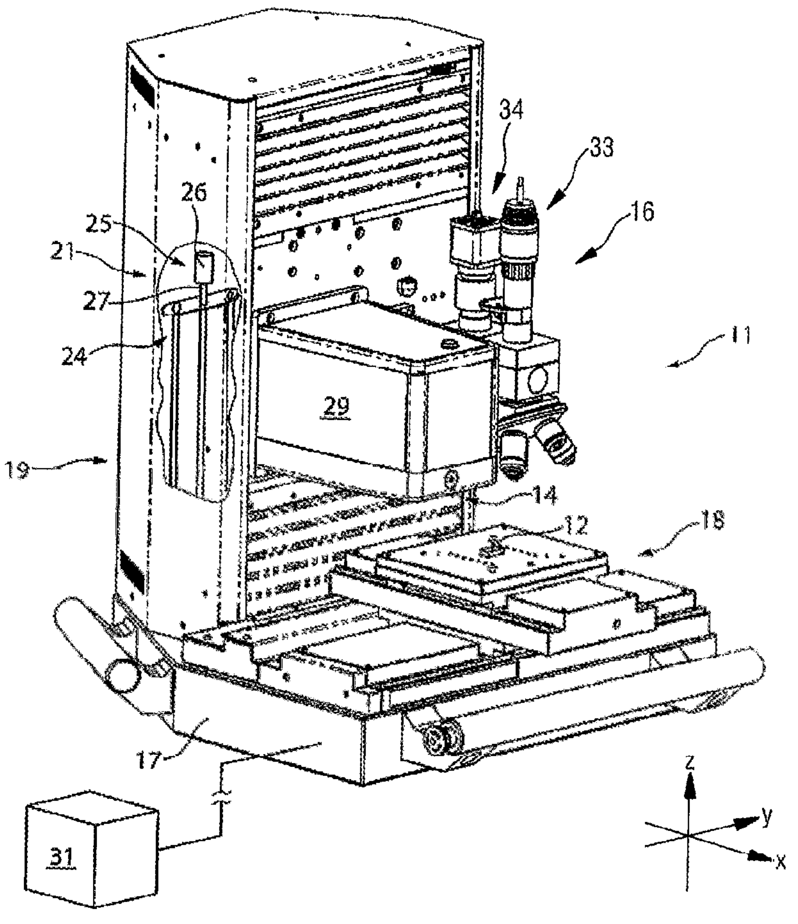

The invention relates to a method for detecting measurement signals during an penetration movement of an indenter of a surface or a coating of a test specimen, in particular for determining the adhesive strength in the coating on the test specimen, and to a measuring device for carrying out the method.

A measuring device for measuring the scratch resistance of a film or a coating is known from DE 699 17 780 T2. This measuring device comprises a stand on which an indenter guide with an indenter that can be attached to, is provided. Furthermore, a drive is provided to move the indenter towards a test specimen along a Z-axis. This indenter drive comprises two L-shaped legs which are aligned with each other and between which a movable carrier is mounted. This movable carrier is held movable to the L-shaped legs by a pair of diaphragm springs. Two L-shaped legs are provided on the carrier, which in turn accommodate an indenter receptacle, which is supported in relation to the L-shaped legs by a pair of diaphragm springs. This arrangement is elastic perpendicular to a plane of the diaphragm springs, which are arranged and aligned in pairs to one another, and rigid in other spatial directions. The indenter receptacle thus has a single degree of freedom along the Z-axis, in which the indenter is moved towards the test specimen perpendicular to the surface of the test specimen.

This measuring device enables a so-called scratch test to be carried out, in which the indenter is moved along a Z-axis towards the surface of the test specimen and the measuring table is moved along a measuring path that corresponds to a straight line that lies in a single spatial direction in the X or Y direction. This means that such a scratch test can be carried out in only one spatial direction or in the opposite direction to this one spatial direction. It is also necessary for the surface of the test specimen to be aligned parallel to the contact surface of the measuring table.

DE 10 2016 123 010 A1 describes an analog measuring device for carrying out a scratch test. During a pre-scan, when a scratch is introduced into the surface of the test specimen or during a post-scan, an indenter is moved along a Z-axis towards the surface of the test specimen and the measuring table is moved along only one spatial direction along a measuring path which corresponds to a straight line.

A measuring device for detecting a surface characteristic is known from JP 2004-28949 A1. A test force is applied to a needle under vibration. The vibration of the needle and the increasing test force are displayed in a common diagram.

The invention is based on the object to propose a method and a measuring device for detecting measurement signals during a penetrating movement of an indenter into a surface or a coating of a test specimen, whereby a flexible adaptation to the course of the test section and/or a contour of the surface of the test specimen is possible.

This object is solved by a method for detecting measurement signals of a penetrating movement of an indenter into a surface or a coating of the test specimen, in which a superimposed displacement movement of the measuring table in an X-direction and a Y-direction is controlled at least temporarily, so that the indenter is guided along an at least two-dimensional test section on the test specimen. This method allows the test section to take any course within an XY-plane. When the indenter penetrates the surface or the coating of the test specimen, the measurement signals are detected along this test section by at least two measuring devices that are aligned differently to the Z-direction and in different spatial directions to the indenter. The at least two measuring devices are preferably positioned on an indenter receptacle, on or in which the indenter is provided. The forces occurring along the test section and acting on the indenter along the test section can be recorded. This allows the frictional and/or transverse forces to be recorded in the direction of scratching as the test section is traversed. The sensors of the at least two measuring devices can detect the forces in any direction in the X- and Y-planes and advantageously determine the frictional forces required for the scratch test by vector addition.

Furthermore, the indenter is preferably superimposed with an additional displacement movement for height compensation due to a change in the contour of the surface of the indenter in the Z-direction along the test section during the passage of the test section, in which the displacement movement of the indenter is controlled in the Z-direction to apply the test force. This means that the test section on the test specimen can have a three-dimensional course. This enables a variety of applications that were previously not possible.

For example, a shell surface can be tested on a drill. In this example, the test section can include an S-shaped contour and at the same time allow an adjustment in height in the Z-direction due to the curvature of the shell surface.

Furthermore, the course of the test section on the test specimen is preferably recorded in at least two spatial directions and stored in the control system, in particular in a data processing program of the control system, before passing through the test section while the test force is applied by the indenter to the surface or coating of the test specimen. This enables reproducible testing of several successive test specimens.

Preferably, the position of the start point and the position of the end point and preferably at least one intermediate point of the test section are defined on the test specimen and geometry data stored by the test specimen are read into the control system and processed in order to control the movement of the measuring table to traverse the test section. The contour of the surfaces of the test specimen is known through the provision of stored geometry data of the test specimen. Taking into account the start and end points and preferably at least one intermediate point, the course of the test section can be determined so that the course of the test section can then be calculated.

According to an alternative embodiment of the method, the position of the start and end points and preferably of the at least one intermediate point is determined on the test section on the test specimen and a program is stored in the data processing device respectively the control system which, in adaptation to the surface of the test specimen, selects geometry elements within the test section by means of which the course of the test section between the start and end points and, if necessary, taking into account the at least one intermediate point, is fitted. Such geometry elements can be, for example, S-shaped contours, ellipses, semicircles, straight lines or the like, so that the course of the test section is defined by stringing together several geometry elements. In the transition area between the individual geometry elements, smoothing can be enabled so that a course of the test section is determined that is preferably free of corners.

According to a further alternative embodiment of the method, the test specimen is positioned in relation to the optical device to determine the test section and the starting point of the test section on the test specimen and the course up to the end point of the test section are then determined and saved using a teach-in method. This allows a freely configurable test section to be selected on the surface of the test specimen.

According to a further preferred embodiment of the method, a test specimen holder can be mounted on the measuring table of the measuring device, which can be controlled in at least one further spatial direction. This can, for example, be in the form of a rotary movement around an X- or Y-axis as well as around a Z-axis. This can further increase the flexibility for carrying out a scratch test.

The object of the invention is further solved by a measuring device for detecting measurement signals during a penetrating movement of an indenter into a surface of a test specimen or into a coating on the test specimen, in which a control system is provided by which the method can be controlled according to one of the embodiments described above. This control system thus enables the measuring table to be controlled independently of each other and simultaneously in the X- and Y-directions during the scratch test—i.e. a displacement movement of the indenter with a test force along the test section—so that a test section can be traversed that lies outside a straight line aligned in the X- or Y-direction. The test force can be controlled constantly or increasingly along the test section. It is also possible to control a decrease in the test force after a penetrating movement of the indenter into a surface of a test specimen or into a coating on the test specimen. The increase or decrease of the test force can be controlled continuously or discontinuously.

Furthermore, the measuring device preferably has an indenter receptacle, which holds the indenter and comprises at least two measuring devices with at least one sensor for detecting the measuring signals through the indenter, which are aligned in two spatial directions that deviate from the Z-direction. Preferably, the sensors are aligned in an X- and a Y-direction. In addition, at least one sensor is preferably provided to detect a deflection in the Z-direction. The measurement signals recorded by the sensors aligned in the X- and Y-directions can be recorded by vector addition to determine the acting frictional forces during the scratch test. The sensor monitoring the Z-axis can detect the penetration movement and control the test force. In particular, a height profile of the test section can be taken into account by the control system, taking into account the course of the surface of the test specimen when controlling the indenter along the Z-axis, so that the indenter can still be controlled with an increasing test force despite a changing height of the test section.

Figure 2:
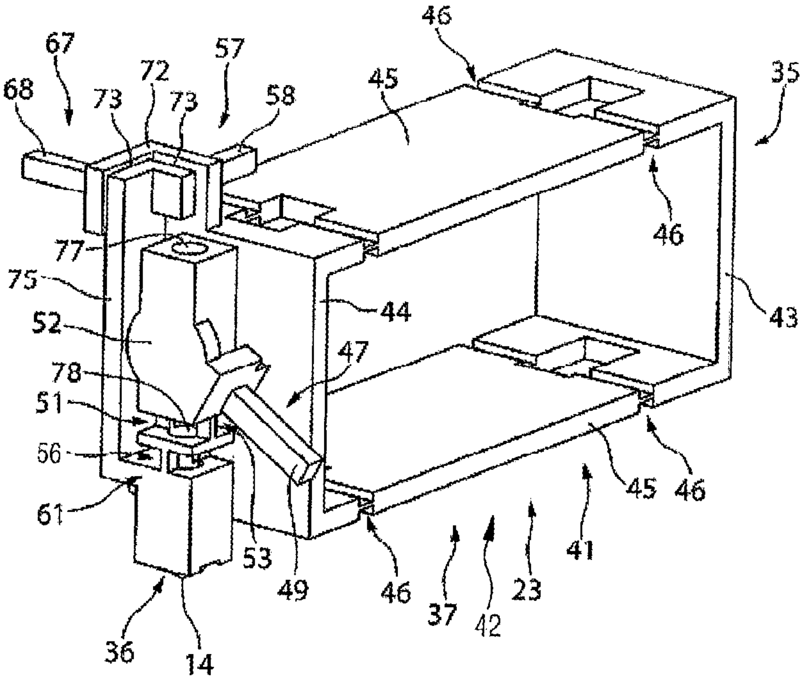
Figure 3:
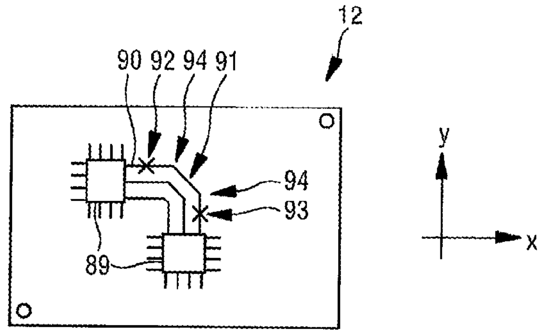
Figure 4:
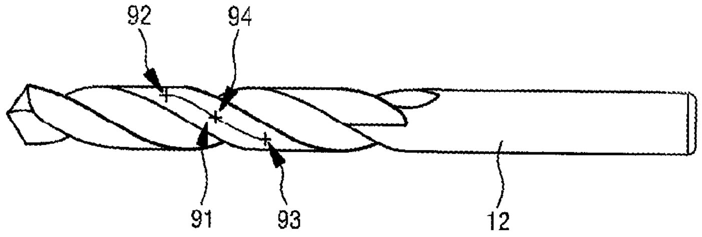

The invention as well as further advantageous embodiments and modifications thereof are described and explained in more detail below with reference to the examples shown in the drawings. The features to be taken from the description and the drawings can be used individually or in any combination in accordance with the invention. It shows:

FIG. 1 a perspective view of a measuring device,

FIG. 2 a perspective view of an indenter receptacle for holding the indenter according to the measuring device in FIG. 1, FIG. 3 a schematic view of an object for a two-dimensional test section for a scratch test, and FIG. 4 a schematic view of an object with a three-dimensional test section for a scratch test.

FIG. 1 shows a perspective view of a measuring device 11. Such a measuring device 11 can be provided for testing mechanical and/or physical properties of surfaces of the test specimens 12 or of the at least one coating on the test specimen 12, such as films, vapor-deposited coatings and/or paints. Furthermore, this measuring device 11 can be provided for determining the adhesive strength of a film, a layer or a coating on objects. For example, CVD- or PVD-coatings can be tested for their adhesive strength.

This measuring device 11 also comprises an optical device 16, which comprises a microscope 33 and/or a camera 34. By means of this optical device 16, information from a penetration point of the indenter 14 into the surface of the test specimen 12 or into the coating of the test specimen 12 can be recorded and electronically evaluated.

This measuring device 11 comprises a base 17. The base 17 accommodates a measuring table 18, which is preferably designed as a cross table. This measuring table 18 can be moved in an X/Y-plane, whereby the measuring table 18 can be moved along a long axis in the X-direction and along a short axis in the Y-direction. A stand 19 is provided on the base 17. A lifting drive device 21 is provided in this stand 19, by means of which an indenter receptacle 23 (FIG. 2) can be moved along the Z-axis relative to the measuring table 18. This indenter receptacle 23 accommodates the indenter 14. Adjacent to the indenter receptacle 23 is the optical device 16, which is preferably movable together with the indenter receptacle 23 relative to the measuring table 18 along the Z-axis. The lifting drive device 21 comprises a column guide 24 and preferably a spindle drive 25, whereby a motor 26 drives a spindle 27 of the spindle drive 25 in order to control a displacement movement along the Z-axis for the indenter receptacle 23. The motor 26 is preferably designed as a high-resolution motor, so that control in very fine steps is possible in order to precisely control a travel path of the indenter receptacle 23 along the Z-axis.

The indenter receptacle 23 is surrounded by a removable measuring head housing 29.

This measuring device 11 can be controlled by a control system which comprises a data processing device 31, which is shown schematically. This data processing device 31 can include a display, an input keyboard and other connections, such as a storage medium or an interface for data transmission.

FIG. 2 shows a first perspective view of the indenter receptacle 23. This indenter receptacle 23 comprises an interface 35, through which this indenter receptacle 23 can be connected to the lifting drive device 21, in particular to the column guide 24. A receptacle 36 for inserting the indenter 14 is provided opposite the interface 35. This indenter 14 is interchangeably arranged in the receptacle 36.

The indenter receptacle 23 is formed between the interface 35 and the receptacle 36 by a solid joint arrangement 37. This solid joint arrangement 37 comprises at least a first solid joint 41. The first solid body joint 41 preferably consists of a closed frame 42. The frame 42 can be rectangular when viewed in cross-section. Viewed from above, the frame can have an exemplary trapezoidal contour. The frame 42 comprises a rear end face 43 on which the interface 35 is provided. Opposite, the frame 42 comprises a front end face 44, to which the receptacle 36 for the indenter 14 is assigned. An upper and lower leg extend between the front and rear end faces 43 and 44. Adjacent to each of the rear end face 43 and the front end face 44, the leg 45 has a joint 46. This joint 46 is formed by a cross-sectional taper of the thickness of the leg 45. In this first embodiment, this cross-sectional taper for forming the joint 46 extends over the entire width of the leg 45.

Preferably, the first solid body joint 41 is formed in one piece, i.e. from a monobloc. This first solid body joint 41 can be produced by milling. The first solid body joint 41 is firmly connected to the rear end face 43 on the lift drive device 31. As a result, the front end 44 can be deflected along the Z-axis relative to the rear end 43.

Due to the geometry, in particular the thickness, of the remaining legs of the joint 46 and/or the material used for the frame 42, the first solid body joint 41 can be designed so that, provided the indenter 14 is in contact with the test specimen 12, a defined force is transmitted to the test specimen 12 in the Z-direction during a predefined travel path along the Z-axis. For example, a travel movement of 1 mm along the Z-axis can generate a force of 30, 50, 100 or 200 N, for example, with an indenter 14 resting on the surface of the test specimen 12. This results in a defined value for the penetration movement of the indenter 14 into the test specimen 12. This enables an initial measured value to be recorded. In this embodiment, the stroke drive device 21 can thus form a first measuring device 47 for a displacement movement of the indenter 14 along the Z-axis.

The solid body joint arrangement 37 comprises at least one further solid body joint 51. Preferably, a second solid body joint 51 and a third solid body joint 61 are provided. These solid body joints 41, 51, 61 are connected directly in series and directly to one another.

The second solid body joint 51 is preferably flexible along the Y-axis and mechanically rigid in the two other spatial directions, i.e. in the X-axis and the Z-axis. The second solid body joint 51 is provided on a projection 52. The projection 52 is fixed directly to the front end face 44 of the first solid body joint 41. The second solid body joint 51 is preferably fixed to an underside of the projection 52 or of a bar or other support. The second solid body joint 51 comprises a leg 53, which can have tapers on both sides, which are preferably formed in mirror image on the leg 53. These tapers are preferably semi-circular in shape. In the present embodiment example, the leg 53 is formed in two parts, whereby a recess can be provided in the central region of the leg 53.

A connecting element 56, preferably a connecting plate, is provided between the second solid body joint 51 and the third solid body joint 61, into which the leg 53 of the second solid body element 51 merges directly. Advantageously, a leg 53 of the third solid body joint 61 extends downwards from this connecting element 56 as seen in the Z-axis. The web 53 is designed analogously to the leg 53, so that full reference can be made to this description.

The third solid body joint 61 is flexible along the X-axis and mechanically rigid in the two other spatial directions along the Y-axis and the Z-axis. The leg 53 of the third solid body joint 61 is arranged rotated by 90° relative to the leg 53 of the second solid body joint 51.

The receptacle 36, into which the indenter 14 can be inserted, is provided at the lower end of the third solid body joint 61.

The solid body joint arrangement 37 with the first solid body joint 41, the second solid body joint 51 and the third solid body joint 61 is preferably formed in one piece. Alternatively, an interface can also be provided between the first and the second solid body joint 41, 51 and/or between the second and the third solid body joint 51, 61.

Sensors 49, which are associated with the projection 52, can be attached to a holder within the measuring head housing 29. These sensors 49 can also detect a displacement movement or a deflection of the first solid body joint 41 along the Z-axis. These measurement signals from the sensors 49 and those from the linear actuator 21 can each be used individually or both for evaluation.

A second measuring device 57 is assigned to the second solid body joint 51 and a third measuring device 67 is assigned to the third solid body joint 61. For example, the second and third measuring devices 57, 67 can be positioned on the upper leg 45 or the front end face 44. As a result, sensors 58, 68 of the second measuring device 57 and third measuring device 67 are decoupled from the Z-axis, i.e. when the first solid body joint 41 is deflected along the Z-axis, they are also moved so that the measurement signals are neutralized by this movement. A sensor holder 72 is preferably provided on the upper leg 45, through which the sensor 58 is received aligned along the Y-axis and the sensor 68 is received aligned along the X-axis. The holder 36 has a reference surface 73, which is assigned to the sensor 58 and sensor 68, so that a change in distance between the reference surface 73 and the sensors 58, 68 can be detected independently of one another. In turn, an open, partially closed or closed support frame 75 is provided on the receptacle 36, which receives the reference surface 73. This reference surface 73 is preferably provided opposite the indenter 14 on the receptacle 36. If distance sensors or proximity switches are used, corresponding components can be provided on the reference surface 73 so that the sensors 58, 68 can detect a change in distance.

A through-hole 77 is provided in the projection 52. This is aligned with a further bore 78 in the projection 52. This bore 77 is larger in circumference than the bore in the receptacle 36 for inserting the indenter 14. On the one hand, this allows the indenter 14 to move around the circumference of a possible deflection of the first and second solid body joint 51, 61. On the other hand, the through-hole 77 can be used to fix the indenter 14 in the holder 36 by means of a tool.

The recesses of the legs 53 can allow the indenter 14 to be guided through at their respective intersection points of the second and third solid body joint 51, 61 for a space-saving arrangement. At the same time, a longitudinal axis of the indenter 14 lies at the intersection of the respective pivot axes of the first and second solid body joints 51, 61. This can enable geometrically defined ratios for precise measurement.

FIG. 3 shows a schematic view of a test specimen 12. The test specimen 12 is, for example, a printed circuit board on which electronic components 89 are located, which are connected with conductor tracks 90. A test section 91 of the test specimen 12 forms, for example, a section of a conductor track 90. A starting point 92 and an end point 93 are determined to define the test section 91. This also determines the length of the test section 91. Preferably, further intermediate points 94 can be defined depending on the course or shape of the test section 91. In this test section 91, the movement of the measuring table 18, on which the test specimen 12 is mounted, is adapted and controlled to the geometry and the course of the conductor path 90 or the test section 91. The indenter 14 is positioned along the Z-axis, resting on the starting point 92. The measuring table 18 is then moved and the indenter 14 is moved in the Z-direction towards the test specimen 12. Since this test section 91 has a course that deviates from an exclusively straight line that runs in the X- or Y-direction, the control of the measuring device 11 triggers a displacement movement of the measuring table 18 so that the test specimen 12 is moved underneath the indenter 14 between the starting point 92, the at least one intermediate point 93 and the end point 93. Between the starting point 92 and the first intermediate point 94 of the test section 91, a rectilinear movement in the X-direction is controlled. Between the first intermediate point 94 and the subsequent second intermediate point 94, an overlap of the displacement movement of the measuring table in the X- and Y-directions is controlled. Advantageously, a separate drive is provided for each traversing axis on the measuring table 18, which can be controlled by the controller. Subsequently, from the second intermediate point 94 to the end point 93, a rectilinear displacement movement in or against the Y-direction is again controlled and applied along the test section.

The forces acting on the indenter 14 as it passes through the test section 91 are recorded and evaluated in relation to the X- and Y-directions by the second measuring device 57 and the third measuring device 67. With regard to the movement of the indenter 14 along the Z-axis, a change in path is detected by the first measuring device 47 as it passes through the test section 91.

The course of the two-dimensional test section 91 shown in FIG. 3 is only exemplary. An arcuate segment-shaped course of the test section 91, an S-shaped course, a closed circle, a triangular contour or another geometric contour lying in the XY-plane can also form the test section 91.

FIG. 4 shows an alternative embodiment of a test specimen 12. For example, the test specimen 12 is a drill. The test section 91 lies on a lateral surface of the drill. A three-dimensional test section 91 is formed between a starting point 92 and an end point 93 of the test section 91. The three-dimensional test section 91 means that both a superimposition of a displacement movement in the X- and Y-directions and also a displacement movement in and/or against the Z-axis are required in order to follow the contour of the lateral surface. When passing through the test section 91 from the starting point 92, there is initially a rise in the Z-axis to an apex or an intermediate point 94. The test section 91 then descends to the end point 93. This change in height of the test section 91 is superimposed with a control of the indenter to apply an increasing test force. The increasing test force can thus be maintained along the test section 91.

Alternatively, an additional test specimen holder can be mounted on the measuring table 18, which holds the test specimen 12, in particular the drill, for example. The longitudinal axis of the test specimen 12 can be aligned parallel to the XY-plane of the measuring table 18. In order to run the test section 91 along the shell surface of the drill and perform a scratch test, a displacement movement of the measuring table 18 in the X- and Y-directions can be controlled in coordination with a rotary movement of the test specimen 12 about its longitudinal axis by the test specimen receptacle. In this case, height compensation of the Z-axis would no longer be necessary, since the test specimen 12 is moved along the test section 91 by the controlled rotary movement of the test specimen 12 by the test specimen receptacle and the additional super-imposition of the displacement movement of the measuring table 18 In the X- and Y-directions.

The invention claimed is:

1. A method for detecting measurement signals during a penetration movement of an indenter into a surface of a test specimen or a coating of a test specimen, in which the test specimen is fixed on a measuring table of a measuring device, in which an optical device is used to determine a starting point for a test section on the test specimen, in which the starting point of the test specimen is aligned with the indenter by a displacement movement of the measuring table, which is actuated by a control system of the measuring device, in which the indenter is placed on the starting point of the test specimen by the control system of the measuring device with a displacement movement along the Z-axis, in which the indenter is applied to a test force acting in the Z-direction along the test section up to the end point of the test section, wherein a superimposed displacement movement of the measuring table in the X-direction and in the Y-direction is controlled at least temporarily, so that the indenter is guided on the test specimen along an at least two-dimensional test section until the end point of the test section is reached, and that measurement signals are detected by at least two measuring devices during the displacement movement of the indenter along the test section, which are aligned in a direction deviating from the Z-direction and in spatial directions deviating from one another with respect to the indenter.

2. The method according to claim 1, wherein the indenter is additionally superimposed with a displacement movement in and/or against the Z-direction for height compensation due to a change in the surface of the test specimen in the Z-direction while being guided along the test section, in which the displacement movement in the Z-direction is controlled in order to apply the test force.

3. The method according to claim 1, wherein before passing through the test section the course of the test section is recorded in at least two spatial directions on the test specimen and stored in the control system of the measuring device.

4. The method according to claim 1, wherein the position of the starting point and the position of the end point of the test section are determined on the test specimen and geometric data stored from the test specimen are read into the control system and processed and therefrom the displacement movement of the measuring table with the test specimen arranged thereon for traversing the test section is controlled.

5. The method according to claim 1, wherein the position of the start point and the position of the end point of the test section on the test specimen are determined and that a program is activated in the control system, which, in adaptation to the contour of the surface of the test specimen, selects geometry elements within the test section by means of which the course of the test section is fitted between the starting point and the end point.

6. The method according to claim 1, wherein the indenter is loaded along the test section with a constant or increasing test force in the Z-direction up to the end of the test section.

7. The method according to claim 1, wherein the indenter is subjected to the test force acting in the Z-direction for a penetration movement into the surface of the test specimen or into the coating of the test specimen and subsequently the test specimen is subjected to a decreasing test force along the test section.

8. The method according to claim 1, wherein the test specimen is positioned and aligned with respect to the optical device and the starting point and the course of the test distance on the test specimen up to the end point are traversed and stored by a displacement movement of the measuring table by means of a teach-in method.

9. The method according to claim 1, wherein at least one test specimen holder is mounted on the measuring table, which is controllable in at least one further spatial direction relative to the measuring table.

10. A measuring device for detecting measurement signals during a penetrating movement of an indenter into a surface of a test specimen or into a coating on the test specimen, with a measuring table on which the test specimen is positionable, said measuring table is displaceable in the x-direction and the y-direction, with a lifting drive device, by means of which a displacement movement of the indenter along a Z-axis is controllable, and with at least one first measuring device for detecting a displacement movement of the indenter along a traversing axis in the Z-direction, wherein measurement signals are detected by at least two measuring devices during the displacement movement of the indenter along the test section, which are aligned in a direction deviating from the Z-direction and in spatial directions deviating from one another with respect to the indenter, and a control system is provided by which the method according to claim 1 is controlled.

11. The measuring device according to claim 10, characterized in that an indenter receptacle is provided, which holds the indenter and has at least two measuring devices for detecting the measuring signals through the indenter, which are aligned differently from the Z-direction and in different spatial directions from one another.

12. The method according to claim 1, wherein before passing through the test section and while applying the test force via the indenter to the surface or coating of the test specimen, the course of the test section is recorded in at least two spatial directions on the test specimen and stored in the control system of the measuring device.

13. The method according to claim 1, wherein the position of the starting point and the position of the end point of the test section and the position of at least one intermediate point are determined on the test specimen and geometric data stored from the test specimen are read into the control system and processed and therefrom the displacement movement of the measuring table with the test specimen arranged thereon for traversing the test section is controlled.

14. The method according to claim 1, wherein the position of the start point and the position of the end point and the position of at least one intermediate point of the test section on the test specimen are determined and that a program is activated in the control system, which, in adaptation to the contour of the surface of the test specimen, selects geometry elements within the test section by means of which the course of the test section is fitted between the starting point and the end point and taking into account at least one intermediate point.

15. The method according to claim 1, wherein the method is used for determining the adhesive strength of the coating on the test specimen.

* * * * *